United States Patent [19]

Lee

[11] Patent Number: 5,613,430

[45] Date of Patent: Mar. 25, 1997

[54] GRINDER-TYPE JUICER

[76] Inventor: Mun-Hyon Lee, 8048 Emerson Pl., Rosemead, Calif. 91770-2429

[21] Appl. No.: 370,111

[22] Filed: Jan. 9, 1995

[51] Int. Cl.$^6$ ............................................. B02C 7/12
[52] U.S. Cl. .......................... 99/510; 99/575; 241/261; 241/261.1
[58] Field of Search .................... 99/510, 511, 512, 99/513, 574, 575, 576, 605; 241/260.1, 261, 261.1, 261.3, 273.2; 100/98 R, 134, 135, 213

[56] References Cited

U.S. PATENT DOCUMENTS

| | | | |
|---|---|---|---|
| 4,506,601 | 3/1985 | Ramirez et al. | 99/513 |
| 4,613,086 | 9/1986 | Granum et al. | 241/261.1 |
| 4,874,136 | 10/1989 | Webster | 241/261 |
| 4,924,770 | 5/1990 | Raub | 99/510 |
| 5,031,522 | 7/1991 | Brixel et al. | 99/511 |
| 5,193,448 | 3/1993 | Antonio | 99/512 |
| 5,433,144 | 7/1995 | Lee | 99/513 |

*Primary Examiner*—David Scherbel
*Assistant Examiner*—Reginald L. Alexander
*Attorney, Agent, or Firm*—Koda and Androlia

[57] ABSTRACT

A grinder-type juicer including an upper and lower plate which squeeze foodstuff while rotating. The upper plate has spiral-shaped guide grooves (or elongated guide lands), the lower plate has juice-squeezing grooves. The juice is squeezed by the oblique action between the two grooves when the upper and lower plates rotate relative to each other in opposite directions with the juice dropping under its own weight and the residue being discharged at the outer edge of the lower plate.

15 Claims, 6 Drawing Sheets

GRINDER-TYPE JUICER

BACKGROUND OF THE INVENTION

1. Field of the Invention

The present invention relates to a juice extractor or a juicer which extracts juice from food stuff by the compression method and more particularly to a grinder-type juicer which extracts juice by grinding and squeezing the food stuff such as vegetables between upper and lower plates.

2. Prior Art

Squeezing-type juicers are used to extract juice from vegetables, tubers, or fruits via compression. Such squeezing-type juicers have been initially proposed by the inventor of the present application, for example, in Korean Utility Model Registration Application No. 86-17672. However, in the past, centrifugation has been the main method of juice extraction used.

The centrifugation method is suitable for extracting juice from fruit, etc. However, in the case of extraction of juice from vegetables and tubers, which are high in fiber but have a low water content, the materials must be sliced, and even at a considerably high rotation speed, the extraction rate is not satisfactory. Moreover, materials such as heavy metals are discharged from the vegetables together with the residue due to centrifugal force, and there are some other problems in the centrifugation method.

To the contrary, the juicer proposed by the inventor of the present application, i.e., a squeezing-type juicer which uses a pair of gears, has the advantage of being designed so that the material may be sliced and then squeezed or simultaneously sliced and squeezed in order to extract the juice. Thus, the juice extraction rate is several times higher than in juicers using the centrifugation method, and heavy metals do not become mixed in with the juice. Among them, dual-gear squeezing-type juicers currently account for the majority of market demand.

Figure 1:
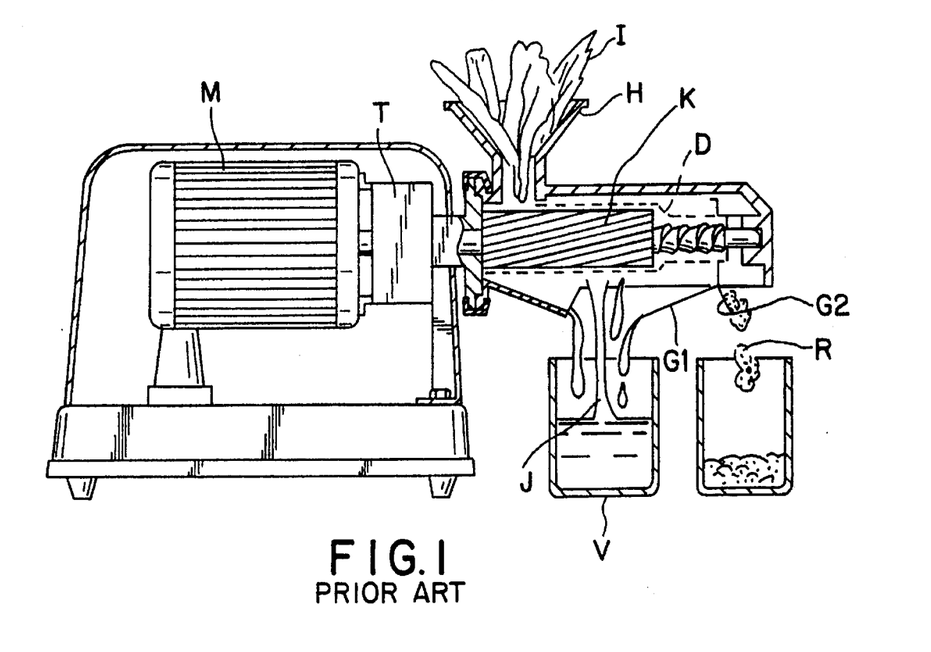
FIG. 1 shows a cross section of a prior art dual-gear-type juicer.

FIG. 1 shows a completed juicer which expands on the above-mentioned proposal of the inventor of the present application and embodies the device of Utility Model Registration No. 59191.

In FIG. 1, by means of a drive gear group T connected to a drive motor M, a pair of mutually interlocking rotary grinding gears K grind the material I which is inserted into a hopper H. When the ground material is moved into a juice-squeezing net D and squeezed, the squeezed juice J drops into a receptacle V via a juice-squeezing guide G1, and the residue R is discharged via the residue guide G2.

However, in this type of juicer, since grinding and squeezing of the inserted material I is carried out by the grinding gears K, a considerable load is applied on the grinding gears K; and a comparatively high-output drive motor M and a drive gear group T are necessary. Moreover, as the grinding gears K must be in the form of helical gears comprising a spiral-shaped cutting edge, high-precision machining is required, and in order to prevent abrasion of the cutting edge with use, special high-quality material of considerable strength must be used.

Furthermore, if the inserted materials contain a large amount of fiber such as pine needles or arrowroot, it is, unless the material to be inserted is divided up into small amounts, not only impossible to carry out proper squeezing of the juice, but the residue ground up between the grinding gears K or juice-squeezing net D becomes jammed, giving rise to the risk of damage to the mechanism, and the use of the juice-squeezing net D causes various problems in handling and washing.

On the other hand, at household appliance and health food stores where squeezing-type juicers are used, as grains or nuts such as soy beans, adzuki beans and adlai must be soaked in water or cooked before they are used for producing juice by conventional juicers or other kitchen purposes, this has an adverse effect on grinding efficiency.

Figure 2:
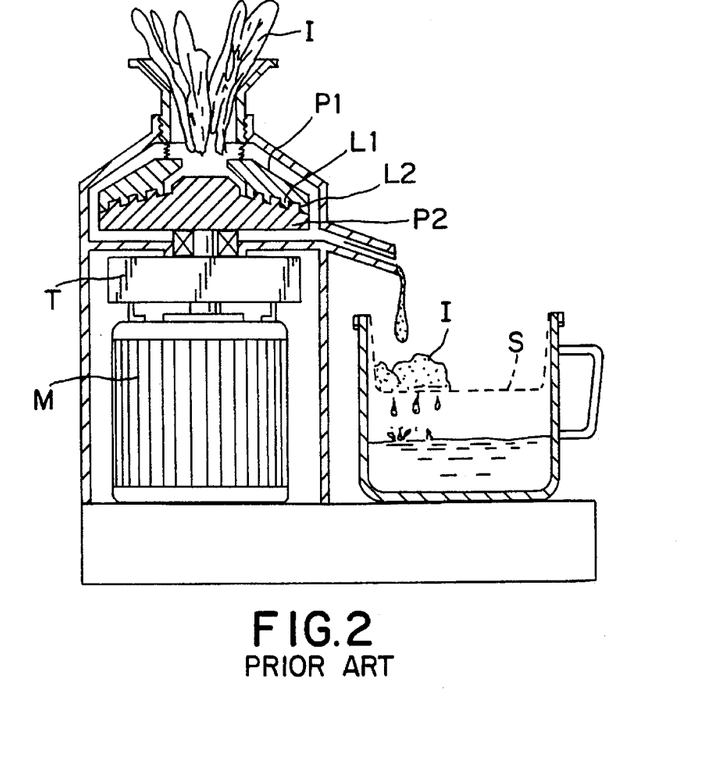
FIG. 2 shows a cross-section of a prior art grinder-type juicer.

In order to solve the above problems, the inventor of the present application proposed a grinder-type juicer as shown in FIG. 2 in Korean Patent Application No. 93-10436 filed on Jun. 14, 1993. This grinder-type juicer is equipped with various cutting lands L1 and L2, and it is designed so that inserted material I such as vegetables are inserted and ground between the grinding surfaces of an upper plate P1 and a lower plate P2 which rotate relative to each other.

This kind of grinder-type juicer is relatively easy to manufacture, shows high durability, and can efficiently grind and squeeze juice out of high-fiber inserted materials or grain. However, it does have one structural problem. In this type of juicer, the grinding surface between the upper plate P1 and the lower plate P2 faces upward and is in the shape of a convex cone; as a result, the juice and the residue from the ground inserted material cannot be separated and drop together under their own weight. For this reason, in order to separate the juice from the ground material I', a filtering sieve S or another independent separating device such as a centrifuge (not shown) becomes necessary. In the final analysis, therefore, no matter how favorable the grinding efficiency of the upper and lower plates P1 and P2, the juice-squeezing efficiency of conventional grinder-type juicers depends on the efficiency of the separating device used.

SUMMARY OF THE INVENTION

In order to resolve these problems, the inventor of the present application conducted research in a wide variety of areas in order to provide a grinder-type juicer which is capable of separating the juice and residue without requiring an independent separating device.

As a result, the inventor of the present invention arrived at a grinder-type juicer that includes a grinding surface existing between its upper and lower plates that faces upward and is in the shape of a concave funnel.

In the juicer of the present invention, the juice and residue are separated from each other by a separating device so that the squeezed juice drops through the center of the grinding surface under its own weight and is discharged, and after extraction of the juice, the residue moves to the outer edge of the grinding surface and is discharged.

BRIEF DESCRIPTION OF THE DRAWINGS

FIGS. 6(A)14 6(H) show the structure and comparison examples of various residue discharge mechanisms which can be applied to the upper and lower plates, in which FIGS. 6(A) through (D) show patterns of the upper plate and FIGS. 6(E) through (H) show pattern diagrams of the structure of the lower plate;

DETAILED DESCRIPTION OF THE INVENTION

The following is a detailed description of the structural principles and preferred embodiments of the grinder-type juicer of the present invention, referring to the attached drawings.

Figure 3:
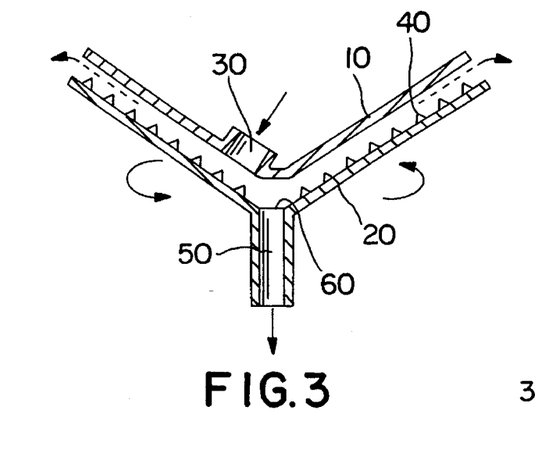
FIG. 3 is a-conceptual diagram showing the basic structure of the grinder-type juicer of the present invention.

As shown in FIG. 3, the grinder-type juicer of the present invention includes an upper plate 10 and a lower plate 20, both rotatable. The upper and lower plates 10 and 20 rotate relative to each other between its lower and upper grinding surfaces, which face upward and have a convex conical shape. When the shapes of the upper and lower plates 10 and 20 are defined based upon the grinding surfaces, the upper plate is substantially a convex shape and the lower plate is substantially a concave shape so that the bottom or surface of the upper plate 10 and the concave surface of the lower plate 20 are parallel to each other as seen from FIG. 3.

In the upper plate 10, there is an insertion opening 30 through which material, that is, foodstuff, to be ground up such as vegetables is inserted. The lower plate 20 is provided on its top or concave surface with a grinding device which is, in this embodiment, a plurality of protuberances 40. The grinding device or the protuberances 40 can be formed on the bottom or convex surface of the upper plate 10, or they can be provided on both the upper and lower plates 10 and 20. The center of the lower plate 20 has a discharge outlet 50 that is covered by a filter net 60.

In FIG. 3, the broken line/dotted arrows indicate the direction of the discharging of the juice which is made by the rotating upper and lower plates 10 and 20. The grinding surface of the upper and lower plates 10 and 20, in other words, the bottom or convex surface of the upper plate 10 and the top or concave surface of the lower plate 20, is equipped with a separating device which is the feature of the present invention. With this separating device, the juice and residue of the foodstuff are separated, and the residue is discharged at the outer edge of the grinding surfaces as indicated by the dotted arrows.

Figure 4A:
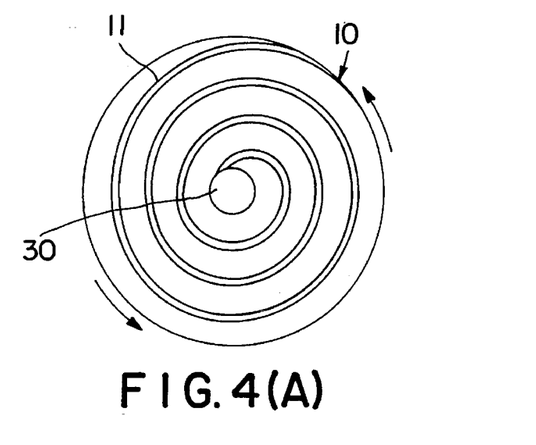
FIGS. 4(A) and 4(B) are a plane projection and plane view respectively showing the structure of the upper and lower plates in FIG. 3.
Figures 4B, 5:
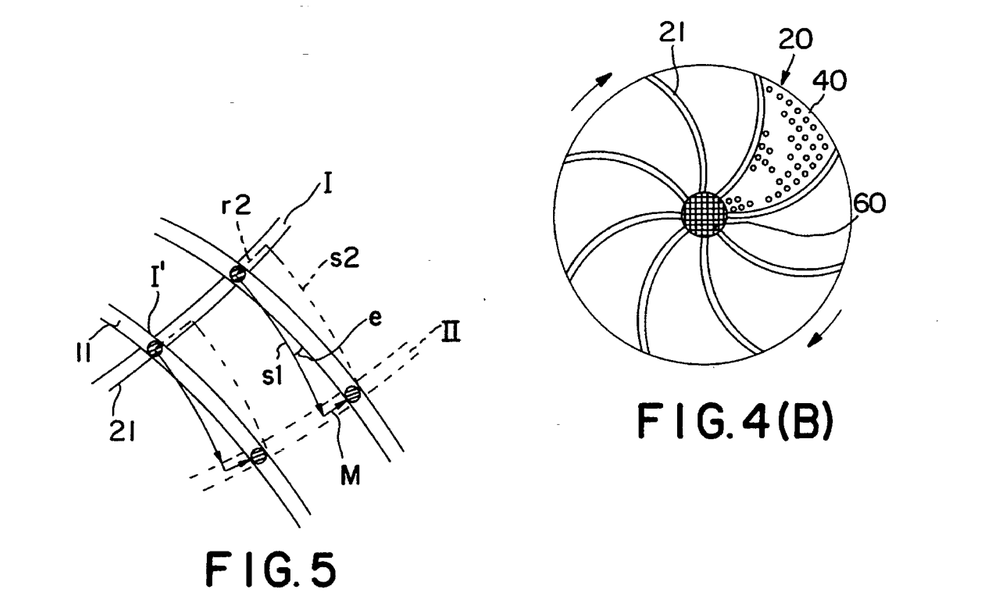
FIG. 5 is an explanatory conceptual diagram showing the principle of action of the upper and lower plates shown in FIG. 4.

More specifically, the separating device of the present invention is obtained based on the structural principle of an oblique spiral operation. The principle and action of the separating device will be explained with reference mainly to FIGS. 4 and 5.

First, FIG. 4(A) shows a projected plane view of the upper plate 10 or the bottom or convex surface of the upper plate 10. More specifically, the upper plate 10 is provided with spiral-shaped guide grooves or elongated guide lands 11 which act as a residue guide mechanism. These grooves or guide lands 11 are installed on the grinding surface which is the underside of the upper plate 10. In the Figure, in order to avoid confusion concerning the relationship to the lower plate 20, the guide grooves or elongated guide lands 11 are shown so as to be projected from the upper surface of the upper plate 10. The guide grooves or elongated guide lands 11 of the upper plate 10 extend outwardly from the insertion opening 30. The guide groove or the guide lands, for example, have the shape of an Archimedes' screw, have a specified tangent angle θ shown in FIG. 5 with respect to an imaginary circumference that has the center of the upper plate 10 as its center, and extend outwardly in a clockwise direction from the insertion opening 30.

FIG. 4(B) shows the grinding surface of the lower plate 20 or the top or concave surface of the lower plate 20. This grinding surface is provided with a plurality of juice-squeezing grooves 21 which are curved and extend radially outward from the filter net 60 which is located at the center of the lower plate 20. The grinding surface is further provided with a plurality of protuberances 40 for grinding up the inserted material. The protuberances 40 are formed between the juice-squeezing grooves 21. Each of the juice-squeezing grooves 21 is in the shape of a curved line having a specified curvature so as to squeeze and discharge the juice more efficiently. In the embodiment shown, the juice-squeezing grooves 21 are designed so that the ends of the grooves 21 rotate counter-clockwise.

The juice-squeezing grooves 21 of the lower plate 20 may have a constant width and depth from the center to their ends. In other words, they may have an identical cross sectional shape. However, it is preferable to design it so that either the width or depth gradually decreases towards the ends in order to increase the efficiency so that the fiber is gradually ground thinner. This arrangement is effective in obtaining the full nutritional value from the fiber.

With the structure described above, the upper and lower plates 10 and 20 are rotated relative to each other. When the inserted material is ground up by the grinding protuberances 40 of the grinding surface between the upper and lower plates and by the action of the separating device, which is the guide grooves or elongated guide lands 11 of the upper plate 10 and the juice-squeezing grooves 21 of the lower plate 20, the juice and residue are separated efficiently from the ground material.

As to the direction of rotation of the upper plate 10 and lower plate 20, the upper plate 10 rotates counter-clockwise as shown in FIG. 4(A), or the lower plate 20 rotates clockwise as shown in FIG. 4(B). In other words, the rotation of the upper plate 10 or the lower plate 20 is made so that the guide grooves or elongated guide lands 11 of the upper plate 10 push the ground material outwardly while squeezing out the juice along the juice-squeezing grooves 21 of the lower plate 20. Thus, the direction of the lower plate 20 is opposite to the direction followed by the guide grooves or elongated guide lands 11 of the upper plate 10 when the grooves or lands 11 make a spiral motion. In this embodiment, since the guide grooves or elongated guide lands 11 of the upper plate 10 rotate in a clockwise direction, this condition is met if the upper plate 10 rotates in a counter-clockwise direction or the lower plate 20 rotates in a clockwise direction.

The principle by which the juice is squeezed and the residue is discharged by the separating mechanism that is made of the guide grooves or elongated guide lands 11 and the juice-squeezing grooves 21 will be described with reference to FIG. 5.

In this Figure, the solid arrows indicate a case in which the upper plate 10 rotates clockwise, and the broken-line arrows indicate a case in which the upper plate 10 rotates counter-clockwise. In either case, the principle of operation by which the juice and the residue are separated through the oblique action of the spiral is identical.

In FIG. 5, the guide grooves or elongated guide lands 11 of the upper plate 10 and the juice-squeezing grooves 21 of the lower plate intersect with each other diagonally. The material I' to be ground by the grinding protuberances 40 is positioned between the guide grooves 11 of the upper plate 10 and the juice-squeezing grooves 21 of the lower plate 20, or it is positioned on the juice-squeezing grooves 21 of the lower plate 20. Then, the material is pushed against the side wall of the guide grooves 11 of the upper plate 10 or the wall of the tip of the protuberances 40.

In the following description, it is assumed that the upper plate 10 is provided with guide grooves 11 (and not lands).

Due to the relative rotation of the lower plate 20, the juice-squeezing grooves 21 which are positioned on the solid line I, after having received the ground material I', moves to the position of the broken line II. At this point, the ground material I', which was in a specified position in a radial direction in the juice-squeezing grooves 21, moves along the guide grooves 11 of the upper plate 10, which has a specified tangent angle θ, taking the direction S1 as the direction of movement of the circumference of the juice-squeezing grooves 21, and then moves outward in a radial direction along the juice-squeezing grooves 21 by the approximate distance of r1=S1×tan θ.

At this point, as the ground material I' is compressed against the side walls of the two grooves 11 and 21, the juice contained in the ground material I' flows inwardly in a radial direction along the juice-squeezing grooves 21. This process takes place by the relative rotation between the upper plate 10 and the lower plate 20, and the squeezed juice is continuously extracted under pressure; it then flows into a discharge outlet; and the more the residue of the ground material I' can move outward along the juice-squeezing grooves 21, the more solid components are left. It is finally discharged at the outer edge of the lower plate 20.

As shown in FIG. 4(A), the guide grooves or elongated guide lands 11 follow a spiral for approximately three turns. When the upper plate 10 and lower plate 20 have completed three revolutions relative to each other, and when the extraction of the juice is completed, the residue of the ground material I' containing solid components only is discharged at the outer edge of the lower plate 20.

If the upper plate 10 rotates in a counter-clockwise direction, the above action is carried out in the same manner. More specifically, in FIG. 5, if the guide grooves 11 which is positioned on the dotted line II of the juice-squeezing grooves 21 moves by a distance of S2 in a counter-clockwise direction along the circumference, then the ground material I' moves by a distance of r2=S2×tan θ along the juice-squeezing grooves 21 in a radial direction. As in the previous embodiment, the action of separating the juice and the discharged residue is carried out in the same manner. Thus, as to the separating mechanism which is characteristic of the present invention, the guide grooves or elongated guide lands 11 installed in the upper plate 10 carry out the squeezing of juice from the material to be ground and the discharging of the residue by an oblique action in which the guide grooves or elongated guide lands 11 of the upper plate 10 diagonally intersect with the juice-squeezing grooves 21 of the lower plate.

FIG. 6 shows examples of various groove patterns which may be selected for the grinder-type juicer of the present invention.

FIGS. 6(A) through 6(D) show examples of spirals for the guide grooves or elongated guide lands 11 of the upper plate 10. These spirals are defined by the following general formula.

$$r = a^M \times \theta \quad (1)$$

where r is the distance from the center in a radial direction, a and M are constants, and θ is a central angle from a specified baseline. Here, a case where M=0 is equivalent to a unit circle having a radius of 1, and a case where M=1 is applicable for an Archimedes' screw.

In the structure of the grinder-type juicer of the present invention, the condition required for the guide grooves or elongated guide lands 11 of the upper plate 10 is:

$$a^M > 1 \quad (2)$$

Accordingly, the radius r must increase as θ increases.

Furthermore, the upper plate 10 provided with guide grooves 11 or guide protuberances must rotate in a relative manner with respect to the lower plate 20 in a direction opposite to the direction of expansion of this spiral, i.e., a direction of −θ which is opposite to the direction in which θ increases.

FIGS. 6(A) through 6(D) show the upper plates with one to four spirals. In this case, the upper plate 10 with guide grooves or elongated guide lands 11 has spirals which correspond to the equations (1) and (2), and it rotates relative to the lower plate 20 in a counter-clockwise direction of −θ, which is opposite to the clockwise direction in which θ increases.

Figure 6A:
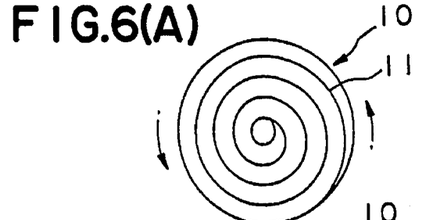
Figure 6B:
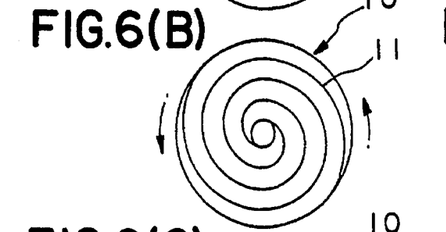
Figure 6C:
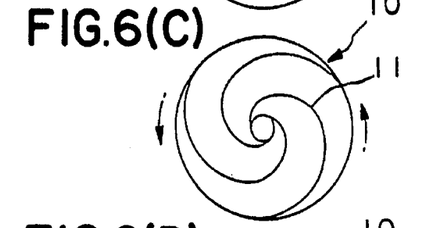
Figure 6D:
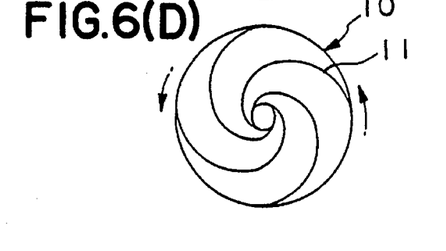
Figure 6E:
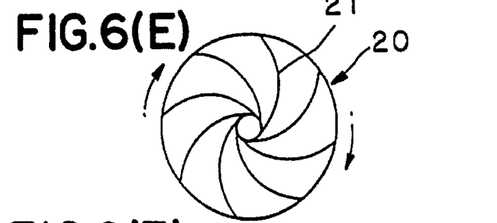
Figure 6F:
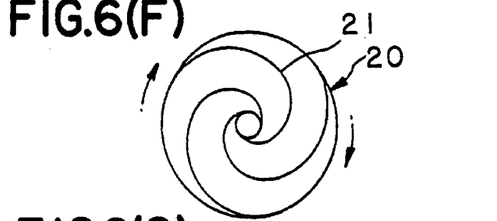
Figure 6G:
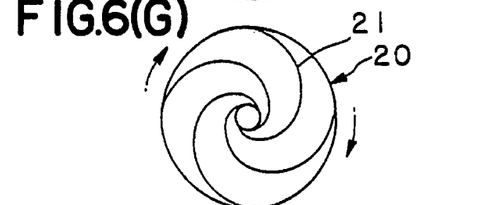
Figure 6H:
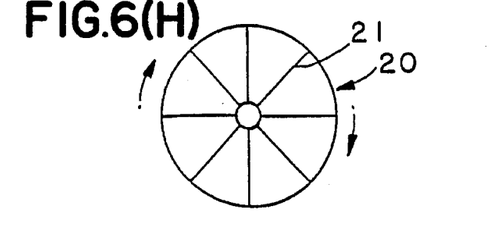

On the other hand, FIGS. 6(E) through 6(H) show various shapes of the juice-squeezing grooves 21 of the lower plate 20. By the oblique action with respect to the guide grooves or elongated guide lands 11 of the upper plate 10, the ground material is compressed, and as long as the squeezed juice and residue are induced to move in opposite directions, any appropriate arrangement may be used. FIGS. 6(E) through 6(G) show various juice-squeezing grooves 21 having spirals which develop in a counter-clockwise direction, and FIG. 6(H) shows juice-squeezing grooves 21 composed of straight radial lines.

Figure 7:
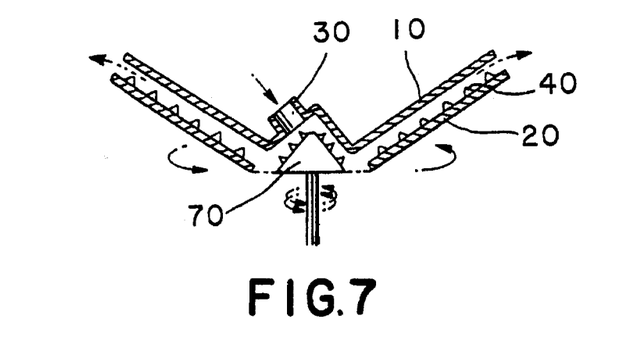
FIG. 7 is a conceptual diagram showing another structure of the grinder-type juicer of the present invention.

The grinder-type juicer of the present invention, as shown in FIG. 7, may include an additional element which is a slicing device.

More specifically, a slicing device 70 is installed on the underside of the insertion opening 30. The slicing device 70 rotates at a speed greater than the relative rotation speed of the upper and lower plates 10 and 20. When the material such as vegetables inserted through the insertion opening 30 is sliced or cut, such sliced or cut material is inserted into the grinding surface between the upper and lower plates 10 and 20. The actions of grinding and separation are promoted when the material has been sliced or cut. This arrangement always allows effective action to take place, particularly in cases where the material inserted is of the bulk type, such as fruit, tubers or vegetables containing long fibers or high amounts of fiber.

Figure 8:
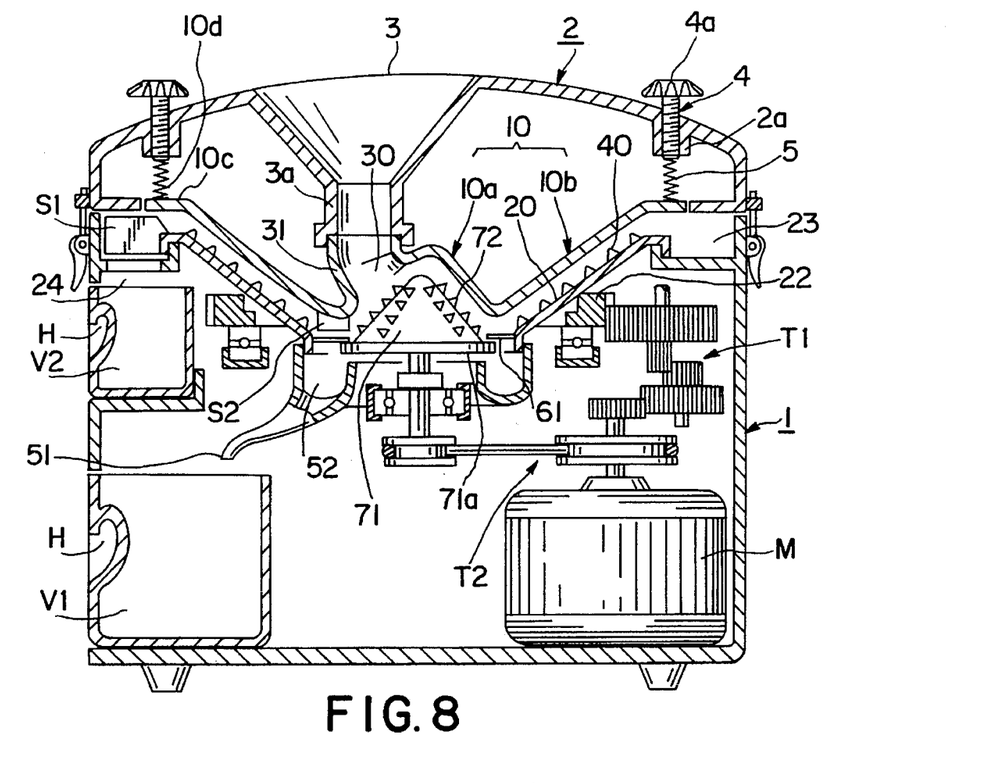
FIG. 8 is a sectional view showing a preferred embodiment of a grinder-type juicer based on the structure shown in FIG. 7.
Figure 9:
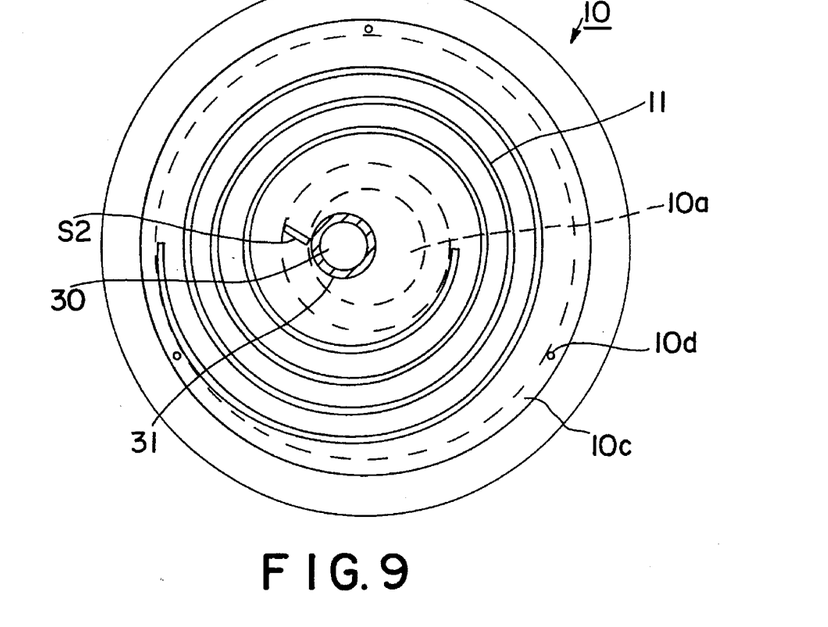
FIG. 9 is a projected plane view of the structure of the upper plate in FIG. 8.
Figure 10:
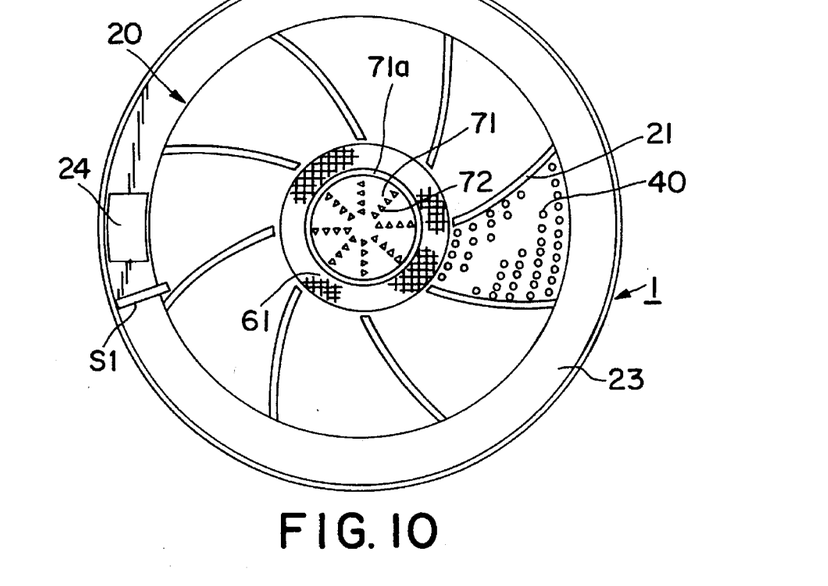
FIG. 10 is a top view of the structure of the lower plate in FIG. 8.

FIGS. 8 through 10 show embodiments that use the structural principle shown in FIG. 7.

In the Figures, the lower plate 20 provided with juice-squeezing grooves (not shown) and the grinding protuberances 40 are connected in a detachable manner to a gear ring 22 which is connected to a drive motor M via a drive mechanism such as a gear train. On the central lower part of the lower plate 20, a slicing device, which is a high-rotational cutter 71 driven by the drive motor M using drive mechanisms such as pulleys and belts T2, is provided.

The cutter 71 is substantially cone-shaped and equipped on its outer surface with a plurality of cutting edges 72. It is preferable to form each one of the cutting edges 72 from a conical plate by lancing or cutting sheet metal processing into a V shape.

In the central part of the lower plate 20, a round opening is formed so that the cutter 71 protrudes thereinto. This opening is provided with a ring-shaped filter net 61, and its inner part is in contact with the rim 71a of the outer edge of the cutter 71. The ring-shaped filter net 61 plays the role of filtering juice which drops into the lower plate 20 under its own weight, and under the filter net 61 is a ring-shaped juice-receiving gutter 52 which guides the juice dropping along the circumference of the filter net 61 into the discharge outlet 51. Beneath the discharge outlet 51, a container V1 which receives the juice is placed. Preferably, the juice enters and is discharged from a cavity formed on one side of the casing 1, and the outer wall of this cavity should form a part of the outside of the casing 1.

The lower plate 20 extends at a specified upward angle of inclination from the outer edge of the cutter 71. It is a feature of the present invention that the lower plate 20 is a concave upward shape which is approximately funnel-shaped; and on the surface of the grinding surface, which is the top or concave surface of this plate, are a plurality of grinding protuberances 40 and a plurality of juice-squeezing grooves as shown in FIG. 4(B). The grinding protuberances 40, as needed, can also be formed in the upper plate 10, or they may be formed in both the upper and lower plates 10 and 20.

On the outer edge of the lower plate 20 is provided with a ring-shaped residue receiving gutter 23 which receives the discharged residue. In addition, at least one sweeper S1 is installed on the outer edge of the lower plate 20, so that the residue accumulated on the bottom of one side of the residue-receiving gutter 23 is pushed out through the residue discharge outlet 24. In order to guarantee a smooth discharge of the residue in the residue-receiving gutter 23, the outer edge of the lower plate 20 is bent downward, and the outer part of the opening inside of the lower plate 20 is preferably bent downward in order to ensure smooth discharge via the juice-receiving gutter 52.

Beneath the residue discharge hole 24, there is a residue receptacle V2. The residue receptacle V2 is preferably designed so that it can be inserted in and taken out of the casing 1 as in the case for the juice receptacle V1.

On the outside of the residue receptacle V2 and the juice receptacle V1, a holding recess H or a handle is provided in order to make holding convenient for the user.

The upper plate 10 corresponding to the shape of the lower plate 20 and the cutter 71 is installed above the lower plate 20. The center of the upper plate 10 protrudes upward in a convex shape so as to conform to the conical shape of the cutter 71, thus forming a cone portion 10a. Around the circumference of the cone portion 10a, a grinding portion 10b having a convex funnel shape is formed so as to conform to the shape of the lower plate 20. The underside of the upper plate 10, which is the grinding surface, is provided with spiral-shaped guide grooves or elongated guide lands as shown in the projection of FIG. 9.

Sweeping of the filter net 61 of the lower plate 20 is carried out in the curved area between the cone portion 10a and the grinding area 10b in order to facilitate the downward movement of the juice. At least one sweeper S2 which guides the ground material on the filter net 61 into the juice-squeezing grooves 21 is provided; and with respect to a flat surface, the sweeper S2 is designed so as to have a specified inclination in a radial direction relative to the guide grooves or elongated guide lands 11.

With the structure described above, residue (fiber) accumulating on the net is scraped off by the grinding plate, causing it to be more finely ground, preventing the net from becoming plugged, and ensuring continuous operation.

Moreover, an insertion opening 30 for the insertion of materials such as vegetables is provided next to the conical portion 10a of the upper plate 10. This insertion opening 30 has a sleeve 31 which extends upward so that the cover 2 can be conveniently installed on the upper plate 10. The sleeve 31 is preferably designed so as to be connected to the sleeve 3a of the hopper 3 of the cover 2.

In the structure described above, after the inserted material is sliced by the cutter 71, it is ground up between the lower surface of the upper plate 10 and the upper surface of the lower plate 20, i.e., between the protuberances 40 of the grinding surface of the corresponding plates.

For this purpose, the upper plate 10 and lower plate 20 should preferably come into contact with each other at a specified and adjustable pressure. In order to provide this adjustable pressure, the upper plate 10 is connected to the cover 2 with a specified degree of elastic strength.

The upper plate 10 is provided with a rim 10c on the outer edge, and springs 5 which are at the ends of a plurality of adjusting screws 4 that are fitted into screw bosses 2a of the cover 2 are used to hold the rim 10c of the upper plate 10 in place. In order to prevent the springs 5 from coming loose, the ends of the springs 5 are attached to projections 10d formed on the rim 10c. By turning the knobs 4a of the screws, the user can adjust the repelling force of the springs 5 in order to adjust the compression strength between the upper plate 10 and the lower plate 20.

In operation, the user inserts material to be juiced such as vegetables into the hopper 3 of the cover 2 and then puts the juicer into operation. The material moves down through the sleeves 3a and 31 and is sliced up by the cutter 71 rotating at a high speed and then moved to the grinding surfaces of the upper and lower plates 10 and 20 by the centrifugal force of the cutter 71 and by the guidance of the sweeper S2, where it is ground up by the grinding protuberances 40.

The juice is squeezed out of the ground up material between the guide grooves or elongated guide lands 11 of the upper plate 10 and the juice-squeezing grooves 21 of the lower plate 20 as shown in FIG. 5. The squeezed juice moves downward by its own weight. The juice is also squeezed out of the residue by the oblique action between the two grooves 11 and 21 of the upper and lower plate 10 and 20, and the residue is pushed upward toward the outer edge of the grinding surface.

The juice drops down and is filtered through the filter net 61 and further drops into the juice-receiving slot 52, finally being discharged through the discharge outlet 51 into the juice receptacle V1. On the other hand, the residue which has been pushed up to the outer edge of the lower plate 20 falls into the residue receiving gutter 23 and is then pushed by the sweeper S1 through the discharge outlet 24, falls into the residue receptacle V2 and is discharged outside the unit.

This arrangement described above not only makes it possible to effectively grind husked grain, nuts, and high-fiber vegetables, but also to carry out separation of the juice and residue during the grinding action, allowing the juice and residue to be separated and discharged by different routes. Thus, the foodstuff is effectively squeezed to produce juice without requiring an independent separator.

Figure 11:
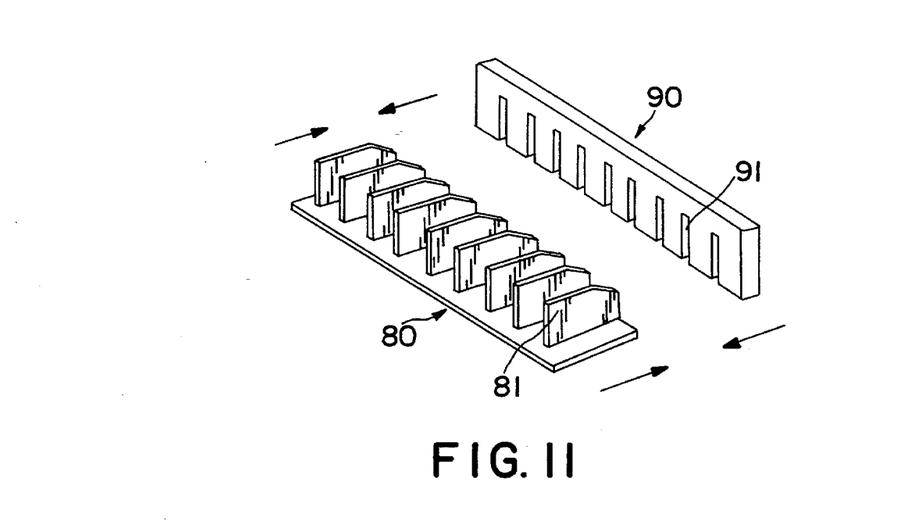
FIG. 11 is a perspective view of the structural principles of another slicing device for use in the grinder-type juicer of the present invention.

In the above, the grinder-type juicer of the present invention is described with reference to one specific embodiment. However, this example is only for the purpose of an explanation and does not restrict the invention in any way. The grinder-type juicer of the present invention can be of various types, and it may contain a slicing device as shown in FIG. 11, for example. The slicing device of FIG. 11 is particularly well-suited for the grinder-type juicer of the present invention.

FIG. 11 shows the two components that make the slicing device, which move towards each other. One component, a cutter array 80 consists of a plurality of cutting blades 81, and the other component, a supporting plate 90 has a plurality of slits 91 so that the cutting blades 81 of the cutter array 80 pass through the slits 91. When the material to be cut is placed between the cutter array 80 and the supporting plate 90, the cutting blades 81 of the cutter array 80 pass through the slits 91 of the supporting plate 90. Thus, the material is cut into slices having a thickness equal to the width between the cutting blades 81 or slits 91.

Figure 12A:
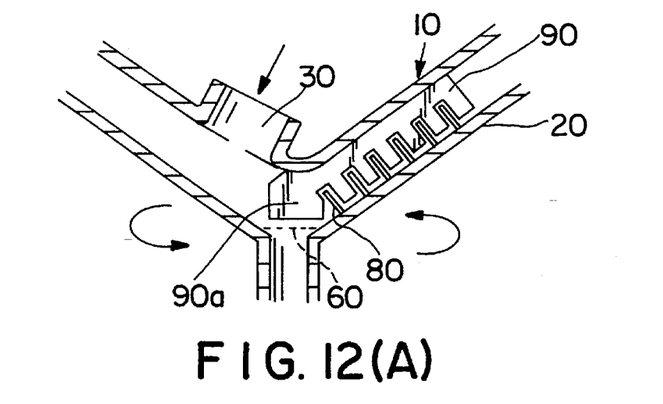
FIGS. 12(A) through 12(C) are summarized sectional views and projected plane views showing examples of various structures of the grinding device used in the grinder-type juicer shown in FIG. 11.
Figure 12B:
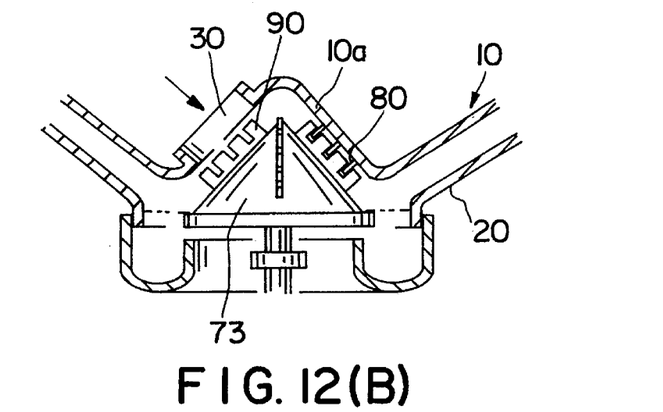
Figure 12C:
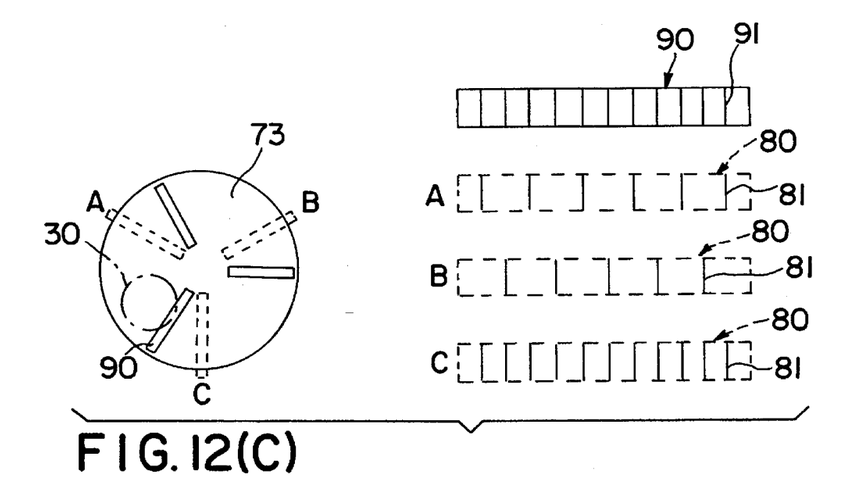

FIGS. 12(A) through 12(C) show examples of the grinder-type juicer of the present invention equipped with the slicing device.

FIG. 12(A) shows the slicing device of FIG. 11 installed in the juicer shown in FIG. 3. The slicing device includes the cutter array 80 with a plurality of cutting blades 81 and the corresponding supporting plate 90 with slits 91 which are installed between the upper plate 10 and the lower plate 20. Thus, the material inserted into the insertion opening 30 is sliced as the upper and lower plates 10 and 20 rotate relative to each other.

In this case, the supporting plate 90 is installed on the upper plate 10. It is preferable that the tip end of the supporting plate 90 has a sweeper 90a that sweeps the filter net 60 of the lower plate 20.

FIG. 12(B) shows another example of a juicer shown in FIGS. 7 through 10 equipped with the slicing device shown in FIG. 11. In this arrangement, one or more supporting plates 90 are mounted to the cutter 73, and the cone section 10a of the upper plate 10 is provided with a cutter array 80. In this arrangement, the cutter 73 can either be driven at high rotation speeds independently of the lower plate 20 or rotates continuously with the lower plate 20 at a relatively low rotation speed.

In the embodiment shown in FIG. 12(B), the arrangement shown in FIG. 12(C) may be more suitable.

More specifically, the supporting plate 90 is provided with a plurality of slits 91 of a specified pitch, and a plurality of the supporting plates 90 are mounted on the cutter 73. The upper plate 10, on the other hand, is provided with a plurality of cutter arrays A, B and C so as to be located on the conical portion. Various cutter arrays A, B and C are set up with the pitch between the cutting blades 81 and their position varied. The cutter array A has the cutting blades 81 arranged with a pitch of two. The cutter array B has the cutting blades 81 arranged with a pitch of two so as not to intersect with the blades of the cutter array A. The cutter array C has the cutting blades 81 arranged with a pitch of one. With this arrangement, the material inserted into the insertion opening 30 is pushed into the supporting plate and sliced as it successively passes through the cutter arrays A, B and C. This design improves the slicing efficiency greatly.

As seen from the above, the present invention provides a highly effective grinder-type juicer which can be easily manufactured, is highly durable, can effectively grind high-fiber materials, grains, etc., and allows simultaneous separation of the juice and residue without requiring an independent separator.

I claim:

1. A grinder-type juicer comprising a convex upper plate with a central portion projecting downwardly and a concave lower plate with a central portion recessed downwardly which are aligned vertically so as to form a space in between for receiving and grinding foodstuff when said upper and lower plates are rotated relative to each other and further comprising a slicing device which is installed in a center of said lower plate which rotates at a speed greater than a rotational speed of said upper and lower plates relative to each other.

2. A grinder-type juicer according to claim 1 wherein:
   said upper plate is provided with a plurality of elongated guide lands;
   said lower plate has a plurality of radial juice-squeezing grooves; and
   juice and residue from said material, which have been ground up by a relative rotation of said upper and lower plates that causes said guide grooves and said juice-squeezing grooves to exert an oblique action, are simultaneously discharged.

3. A grinder-type juicer according to claim 2 wherein:
   said elongated guide lands correspond to Equations (1) and (2) below:

$$r = a^M \times \theta \quad (1)$$

wherein $$a^M > 1 \quad (2)$$

when a radius extending from a center of said upper plate is taken as r, a central angle from a specified baseline is taken as θ, and a and M are constants.

4. A grinder-type juicer according to claim 3 wherein:
   a direction of relative rotation of said upper and lower plates is −θ with respect to said elongated guide lands of said upper plate.

5. A grinder-type juicer according to claim 3 wherein:
   a direction of relative rotation of said upper and lower plates is −θ with respect to said elongated guide lands of said upper plate.

6. A grinder-type juicer according to claim 2 wherein:
   said squeezed juice drops into a center of said lower plate by its own weight; and
   said separated residue is discharged toward an outer edge of said lower plate while juice is being squeezed out by said oblique action.

7. A grinder-type juicer according to claim 1 further comprising a sweeping device moving above a filter net of said lower plate so as to prevent said net from being plugged.

8. A grinder-type juicer comprising a convex upper plate with a central portion projecting downwardly and a concave lower plate with a central portion recessed downwardly which are aligned vertically so as to form a space in between for receiving and grinding foodstuff when said upper and lower plates are rotated relative to each other, wherein a convex surface of said upper plate is provided with a spiral groove extending outwardly from substantially a center of said upper plate and a concave surface of said lower plate is provided with a plurality of grooves each extending radially from a center to an outer edge of said lower plate and a slicing device for slicing said foodstuff before said foodstuff is ground by said upper and lower plates, said slicing device comprising a supporting plate and a plurality of cutting plates, said supporting plates being provided with a plurality of slits and mounted to said convex surface of said upper plate and said plurality of cutting plates being provided on said concave surface of said lower plate so that said cutting plates pass through said slits of said supporting plates.

9. A grinder-type juicer according to claim 8, wherein said upper plate and lower plates are rotated in opposite directions.

10. A grinder-type juicer according to claim 8 further comprising a rotary cutter provided in a hole formed at a center of said lower plate.

11. A grinder-type juicer comprising a convex upper plate with a central portion projecting downwardly and a concave lower plate with a central portion recessed downwardly which are aligned vertically so as to form a space in between for receiving and grinding foodstuff when said upper and lower plates are rotated relative to each other, wherein a convex surface of said upper plate is provided with a spiral groove extending outwardly from substantially a center of said upper plate and a concave surface of said lower plate is provided with a plurality of grooves each extending radially from a center to an outer edge of said lower plate, a rotary cutter provided in a hole formed at a center of said lower plate and a slicing device for slicing said foodstuff before said foodstuff is ground by said upper and lower plates, said slicing device comprising a plurality of supporting plates and a cutter array, each one of said plurality of supporting plates being provided with a plurality of slits and mounted on said rotary cutter and said cutter array being provided with a plurality of cutting blades and mounted on said convex surface of said upper plate so that said cutting blades of said cutter array pass through said slits of said supporting plate.

12. A grinder-type juicer comprising a convex upper plate with a central portion projecting upwardly and a concave lower plate with a central portion recessed downwardly which are aligned vertically so as to form a space food in between for receiving and grinding foodstuff when said upper and lower plates are rotated relative to each other; wherein a convex surface of said upper plate is provided with a spiral 14 groove extending outwardly from substantially a center of said upper plate and a concave surface of said lower plate is provided with a plurality of grooves each extending radially from a center to an outer edge of said lower plate, a rotary cutter provided in a hole formed at a center of said lower plate and a slicing device for slicing said foodstuff before said foodstuff is ground by said upper and lower plates, said slicing device comprising a plurality of supporting plates and a plurality of cutter arrays, each one of said plurality of supporting plates being provided with a plurality of slits and mounted on said rotary cutter and each one of said cutter arrays being provided with a plurality of cutting blades and mounted on said convex surface of cutting blades and mounted on said convex surface of said upper plate so that said cutting blades of said cutter arrays pass through said slits of said supporting plate, a pitch of said plurality of cutting blades of one of said cutter arrays being different from a pitch of cutting blades of other cutting arrays.

13. A grinder-type juicer according to claim 8 wherein said upper plate is provided with a plurality of said spiral grooves.

14. A grinder-type juicer according to claim 8 wherein said plurality of grooves of said lower plate are curved.

15. A grinder-type juicer according to claim 8, wherein said plurality of grooves of said lower plate are straight.

\* \* \* \* \*